March 7, 1933.  W. G. KLINGBEIL  1,900,349
THERMOSTATIC MIXING VALVE
Filed Aug. 22, 1931    2 Sheets-Sheet 1

March 7, 1933.　　　W. G. KLINGBEIL　　　1,900,349
THERMOSTATIC MIXING VALVE
Filed Aug. 22, 1931　　2 Sheets-Sheet 2
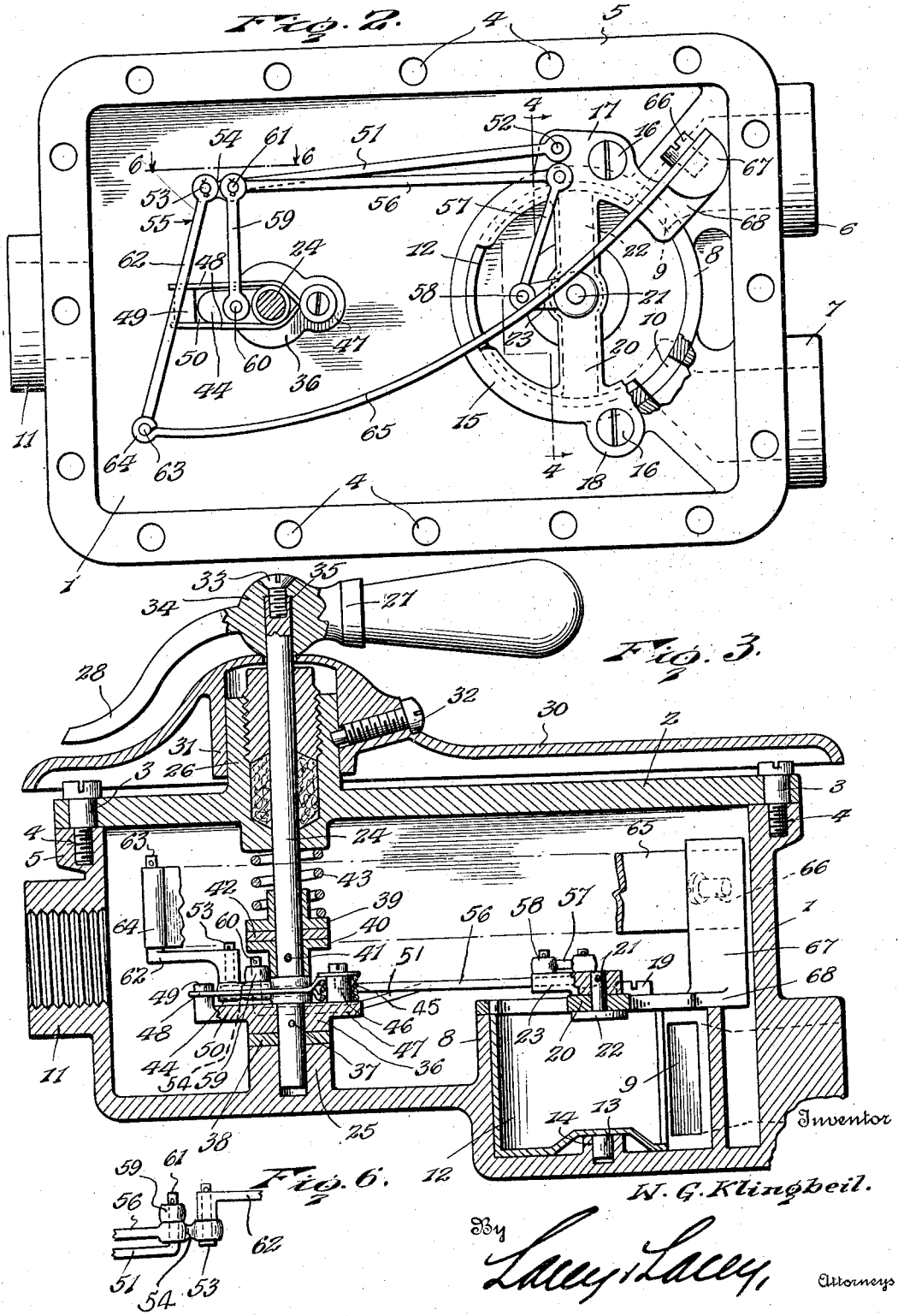
Inventor
W. G. Klingbeil.
By Lacey & Lacey,
Attorneys Patented Mar. 7, 1933

1,900,349

UNITED STATES PATENT OFFICE

WALTER G. KLINGBEIL, OF PORTLAND, OREGON

THERMOSTATIC MIXING VALVE

Application filed August 22, 1931. Serial No. 558,793.

This invention relates to plumbing and more particularly to a thermostatic mixing valve by means of which the temperature of water flowing to a shower bath or the like may be controlled.

One object of the invention is to provide a valve of this character having a casing into which hot and cold water may be fed in order to produce a mixture of the desired temperature and in addition permit the proportions of hot and cold water flowing into the casing to be automatically controlled in order to maintain the mixture at the desired temperature. It will thus be seen that when the valve is set to provide a mixture of a determined temperature, an automatic adjustment controlled by a thermostatic element may take place and flow of hot water reduced in order to retain the mixture at the desired temperature and likewise flow of cold water may be reduced automatically in case the temperature of the hot water entering the casing should become lower.

Another object of the invention is to so construct this valve that when the valve is automatically adjusted by expansion of contraction of a thermostatic strip forming part thereof, necessary movements of elements forming the valve and its adjusting mechanism may take place without changing the setting which controls the temperature desired.

Another object of the invention is to so construct this valve that it may be set into a wall of a room where it will be hidden from view and only a face plate and temperature controlling handle exposed to view thereby causing the device to be attractive in appearance.

The invention is illustrated in the accompanying drawings, wherein:

Figure 1 is a view looking at the front of the improved valve.

Figure 2 is a view of the casing with its cover and associated parts removed,

Figure 3 is a longitudinal sectional view through the valve,

Figure 4 is a sectional view taken transversely through the valve along the line 4—4 of Figure 2, Figure 5 is a fragmentary view illustrating a movement which takes place when an adjustment is effected by the temperature controlling handle in advance of warping of the thermostatic strip, and Figure 6 is a fragmentary view taken along the line 6—6 of Figure 2.

Apparatus embodying the present invention has a casing 1 which is preferably rectangular in shape but may be of any shape desired. A removable cover 2 is provided for the casing and is secured by screws 3 passed through marginal portions of the cover and engaged in threaded sockets 4 formed in a bead or thickened marginal portion 5 extending about the walls of the casing.

Sleeves 6 and 7 to have engagement with cold and hot water supply pipes are provided at one end of the casing and these sleeves project inwardly as shown in Figure 2 and communicate with a housing 8 within the casing through openings 9 and 10 formed in walls of the housing. Therefore, water may flow through the inlets 6 and 7 into the housing 8, which opens into the casing, and fill the casing with a mixture of hot and cold water which will flow from the casing through an outlet 11 leading from the opposite end of the casing, and pass through a feed pipe to a shower or other apparatus to which it is desired to supply water having a determined temperature.

The housing 8 is in the form of a cup or well having annular side walls and is shown as formed integral with the bottom of the casing. Within the housing is disposed a rotatable valve 12 in the form of a shell or cup which fits snugly against the bottom and walls of the housing and has its bottom provided with a central stud 13 received in a socket 14 formed centrally of the bottom of the housing. The annular wall of the valve does not extend entirely about the same and its side edges are spaced from each other such a distance that when the valve is in the position shown in Figure 2, the side edges of the annular wall of the valve will be substantially flush with sides of the inlet openings 9 and 10 and these openings will be entirely uncovered. At its open end (which is its top in the drawings) the housing 8 carries a head 15 which is in the form of a spider and is secured by screws 16 passed through openings formed in lugs 17 and 18 projecting from marginal portions of the head and engaged in threaded openings formed in lugs 19 projecting outwardly from the housing. The cross bar 20 of the head is formed with an opening to receive a stem 21 rising from an arm or bridge 22 which is part of and extends diametrically of the valve 12, and upon the upper end portion of this stem is fixed a crank 23. Therefore, the valve 12 will be securely held in its proper position within the housing but when movement is imparted to the crank the valve will be rotated in the housing and its wall will be set to close the hot water inlet opening 10 or the cold water inlet opening 9 according to the direction in which the valve is turned.

The valve is to be manually set in order that water having a desired temperature will pass from the casing to a shower nozzle or other fixture and automatic adjustment of the valve is to be permitted in order that this predetermined temperature may be maintained. The adjusting mechanism is clearly shown in Figures 2 and 3 and includes a shaft 24 which extends through the casing with its inner end rotatably received in a socket 25 formed upon the bottom or inner wall of the casing and its outer portion extending through a packing gland or neck 26 carried by the cover 2. By this arrangement a water tight joint will be formed about the portion of the shaft which extends through the cover and leakage prevented. This shaft is to be rotated when setting the valve to supply water of a desired temperature and in order to do so there has been provided a handle 27 having one end portion formed into a pointer 28 which extends in operative relation to scale markings 29 upon a shield 30. The shield is in the form of a plate which completely covers the casing and its cover 2 and is formed with a socket 31 which fits snugly about the neck 26 where it is secured by a set screw 32. It will thus be seen that the shield may be slid into place about the neck and secured by its set screw and the handle 27 then applied to the outer end of the shaft 24 and secured by a screw 33 which passes through an opening, formed in the hub 34 of the handle, and into a threaded socket 35 formed in the outer end of the shaft. About the shaft fits a mounting 36 in the form of a disc which is pinned to the shaft, as shown at 37, and between this mounting and the socket 25 is disposed a friction washer 38.

Above the mounting are disposed collars 39 and 40, the lower one of which is pinned to the shaft, as shown at 41, and between these collars is a friction washer 42. A spring 43 which is coiled about the shaft and has one end bearing against the cover 2 and its other end bearing against the collar 39 exerts pressure longitudinally of the shaft which causes the washer 42 to be compressed between the mounting and the socket 35. Therefore, rotation of the shaft will be frictionally resisted and when the handle is grasped and moved to rotate the shaft until the pointer 28 is moved to the desired marking of the scale 29, the shaft and the mounting will remain in the adjusted position.

An arm 44 which fits loosely upon the shaft between the mounting 36 and the collar 40 extends radially from the shaft and in order to yieldably resist turning of this arm about the shaft and permit it to follow the movement of the shaft when the handle is moved there has been provided a spring 45 which is coiled about a post 46 rising from an extension 47 of the mounting and having arms 48 which straddle the shaft and extend along opposite sides of the arm 44 with their ends normally bearing against opposite sides of an abutment lug 49 rising from the extension 50 of the mounting located at the opposite side thereof from the extension 47. The disk 36 with the extension 50 constitute a crank or lever which rocks with the setting shaft 24.

A mounting rod 51 extends longitudinally in the casing and has one end pivoted to the extension 17 of the head 15 as shown at 52 and its other end is bent to form a pin 61 which engages through the enlarged portion 54 of a lever 56 and pivotally mounts said lever. The rod 51 thus forms a support for the lever 56 and the parts associated therewith.

The lever 56 extending longitudinally of the casing and is pivoted, at its end more remote from the pivot 61, to one end of a link 57, the other end of which is pivoted to the crank 23 as shown at 58. A link 59 has one end pivoted to the arm 44 by a pin 60 rising from the arm and its other end pivotally engaged over the pivot 61. A link 62 extends transversely of the casing and at one end carries a pin 63 engaged through a sleeve 64 formed at one end of a thermostatic strip 65, the opposite end of the link being pivotally engaged about a pin 53 which is also pivotally engaged with the end of the lever 56 near the fulcrum 61.

The thermostatic bar or strip 65 extends longitudinally in the casing and has its end remote from the link 62 firmly secured by a screw 66 to a post 67 rising from a side extension 68 of the head 15 above the cold water inlet. By referring to Figure 2 it will be seen that the strip 65 is curved longitudinally and that when it is caused to expand or to contract due to changes in temperature of water in the casing, movement will be imparted to the lever 56 through the link 62, and as the lever turns about its pivot 61, the valve 12 will be turned in the valve housing.

When this valve is in use, the handle 27 is turned until the pointer has been moved to the desired position relative to the scale 29. In Figure 1 the pointer has been moved to the number ninety upon the scale and it will be understood that with the pointer in this position the normal temperature of water passing from the casing will be 90°. With the handle in the position shown in Figure 1, the mounting 36 and the arm 44 will be in the position shown in Figure 2 and the openings 9 and 10 both uncovered. The valves for the water pipes leading to the inlets 6 and 7 may then be turned on and water will flow through the inlets into the valve housing 8 where it will mix and flow from this valve housing into the casing and out through the outlet 11 as a mixture of hot and cold water.

In case the water flowing through the hot water supply pipe becomes hotter after it has been flowing for some time, the temperature of the water in the casing will be raised and this will cause the thermostatic strip 65 to expand and shift the link 62. The lever 56 will thereby be turned about its pivot 61 and the movement transmitted through the link 57 to turn the crank 23 and rotate the valve in a direction to move its wall across the hot water inlet opening 10. Therefore, the supply of hot water will be reduced until the temperature of the water is restored to 90°. If the water flowing through the hot water inlet becomes cooler, the thermostatic strip will contract and the several parts will be moved in the opposite direction whereby the valve 12 will be turned in a direction to move across the cold water inlet opening 9 and reduce the quantity of cold water. When either movement takes place the link 59 will have a tendency to restore the arm to its normal position and return movement of this arm to its normal position will very easily take place.

When the handle is turned to set the apparatus, the shaft 18 and crank 50 turn with it and will be held in the set position by the friction washers 38 and 42 and spring 43 cooperating therewith. The arm 44 will move with the crank 50 under the influence of the spring 45 until checked by the force of the thermostatic strip but the spring 45 will permit further movement of the crank 50 to the desired position without forcing the thermostatic strip to bend. When the thermostatic strip warps, it will cause the arm 44 to assume its normal position over and alined with the crank 50, the movement of the arm 44 shifting the fulcrum 41, as will be understood.

I have therefore provided a mixing valve having such a construction that it may be initially set to cause water of a desired temperature to be obtained and there has also been provided means controlled by a thermostat for automatically adjusting the valve when necessary.

What is claimed is:

1. In a thermostatic mixing valve, a casing having inlets for hot and cold water and an outlet, a valve to control flow through the inlets, a stem for said valve, a crank fixed to said stem, a shaft rotatably mounted in the casing and projecting therefrom, a crank carried by and turning with the shaft, an arm loose upon the shaft above and normally alined with said crank, a spring carried by the crank and engaging opposite sides of the arm whereby the shaft and arm may move together when the shaft is rotated and the arm may move about the shaft when the shaft is stationary, a thermostatic strip anchored at one end in the casing, and connections between the opposite end of said strip and said arm and the crank on the valve stem.

2. In a thermostatic mixing valve, a casing having inlets for hot and cold water and an outlet, a valve in the casing arranged to close or open the inlets, a stem for said valve, a crank fixed to said stem to rotate the stem and valve when moved, a cover for said casing, adjusting means for said valve having a shaft rotatably mounted in said casing and projecting through said cover, a crank carried by and turning with the shaft, an arm loose upon the shaft and resting on the crank and normally alined therewith, a spring carried by said crank and having its ends bearing against opposite sides of said arm whereby the crank may move beyond the arm and the arm will tend to follow the crank, a supporting rod pivoted at one end in the casing, a lever fulcrumed at the other end of said rod, a link pivotally connecting one end of said lever to the crank on the valve stem, a thermostatic element connected with the other end of the lever, and a connection between the fulcrum of said lever and the arm loose on the shaft.

3. A thermostatic mixing valve apparatus including a casing having inlets for hot and cold water and an outlet, a valve in the casing controlling the inlets, a setting shaft, a crank fixed on said shaft, an arm loose upon the shaft and normally alined with the crank, a spring carried by the crank and engaged with said arm whereby the arm may have relative movement when the shaft is stationary, a supporting rod pivoted at one end in the casing, a lever fulcrumed between its ends on the free end of said rod, operative connections between one end of said lever and the valve, a connection between the fulcrum of the lever and said arm, a thermostatic strip anchored at one end, and a connection between the free end of the thermostatic strip and the end of the lever remote from the valve.

4. A thermostatic mixing valve apparatus including a casing having inlets for hot and cold water and an outlet, a valve controlling flow through the inlets, a thermostatic strip, operative connections between said strip and the valve, a setting shaft, connections between said shaft and the valve including a lost motion device whereby the valve may be set by the shaft and may have additional movement controlled by the thermostatic strip, a collar fixed on the shaft, a friction washer bearing on said collar, and a spring maintaining contact between the washer and the collar whereby the shaft will be frictionally held in a set position.

In testimony whereof I affix my signature.

WALTER G. KLINGBEIL. [L. S.]